United States Patent [19]

McNellis

[11] 4,248,002
[45] Feb. 3, 1981

[54] DOWNRIGGER SYSTEM

[75] Inventor: John R. McNellis, Paw Paw, Mich.

[73] Assignee: Pacific-Atlantic Products, Ltd., Kalamazoo, Mich.

[21] Appl. No.: 78,518

[22] Filed: Sep. 24, 1979

[51] Int. Cl.³ .............................................. A01K 97/00
[52] U.S. Cl. ..................................... 43/27.4; 242/106
[58] Field of Search ............... 43/4, 27.4, 43.12, 26.1; 242/106

[56] References Cited

U.S. PATENT DOCUMENTS

| 3,193,964 | 7/1965 | Hurst | 43/43.12 |
| 3,719,331 | 3/1973 | Harsch | 43/43.12 |
| 4,050,180 | 9/1977 | King | 43/27.4 |

*Primary Examiner*—Nicholas P. Godici
*Attorney, Agent, or Firm*—Dressler, Goldsmith, Shore, Sutker & Milnamow, Ltd.

[57] ABSTRACT

An elongated downrigger system having a relatively long extension arm for safely positioning the downrigger lines far from the propeller and hull of a boat. The elongated downrigger system is equipped with a movable carriage assembly to permit the weighted end of the downrigger line to be readily grasped when it is desired to attach a fishing line, bait or lure, even though the extension arm is much longer than the average length of a human arm. The carriage assembly has a glide member, such as a roller, to ride upon the long extension arm and has at least one cable guide, such as a pulley, to guide the carriage assembly on the cable. A drive member is secured to the downrigger cable and engages a driven member on the carriage assembly to drive and move the carriage assembly to an inward attachment position when the cable is wound upon the downrigger reel.

23 Claims, 7 Drawing Figures

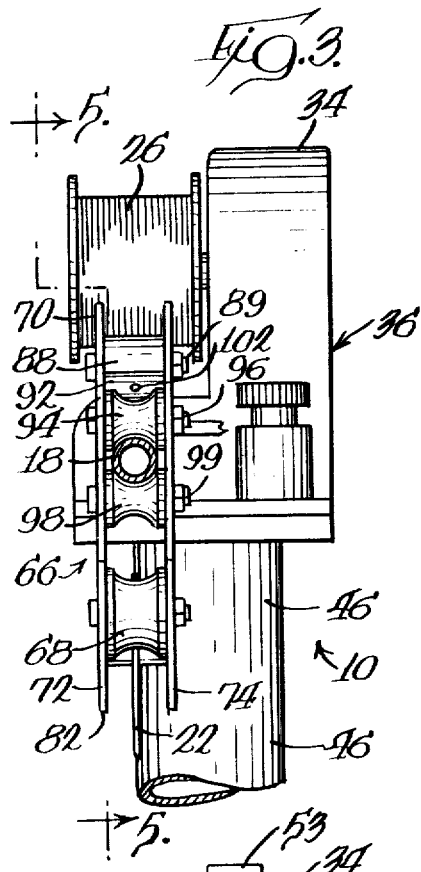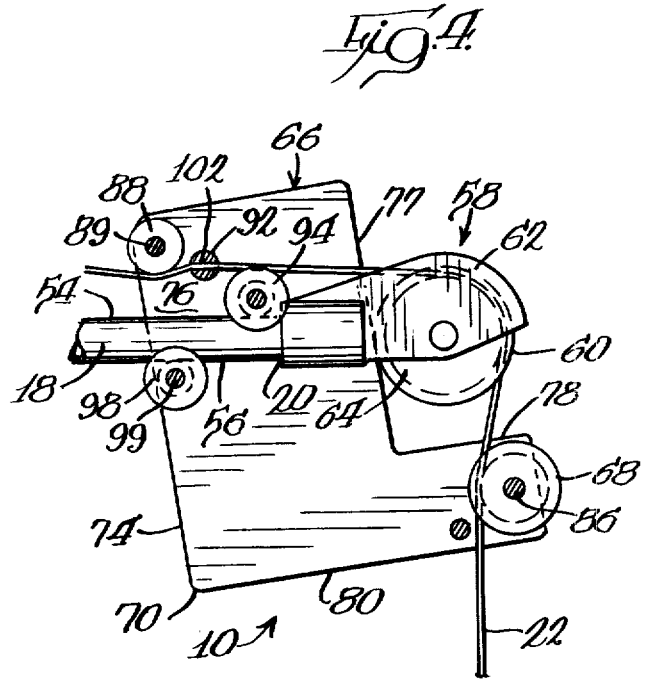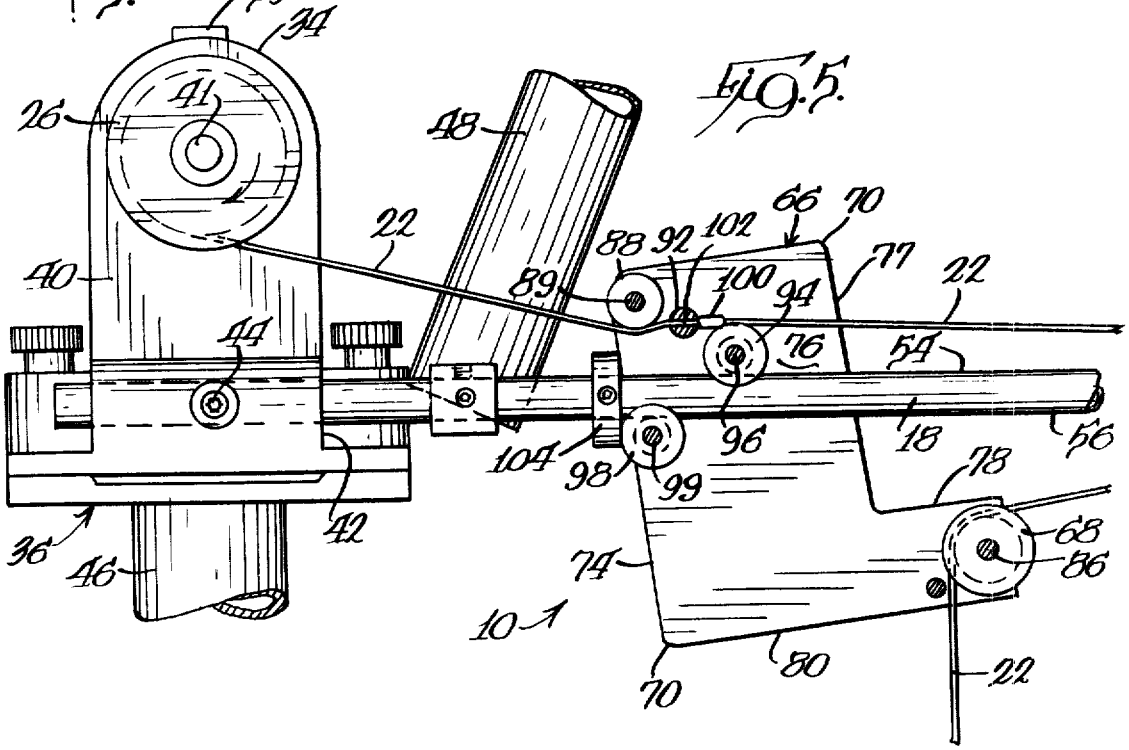

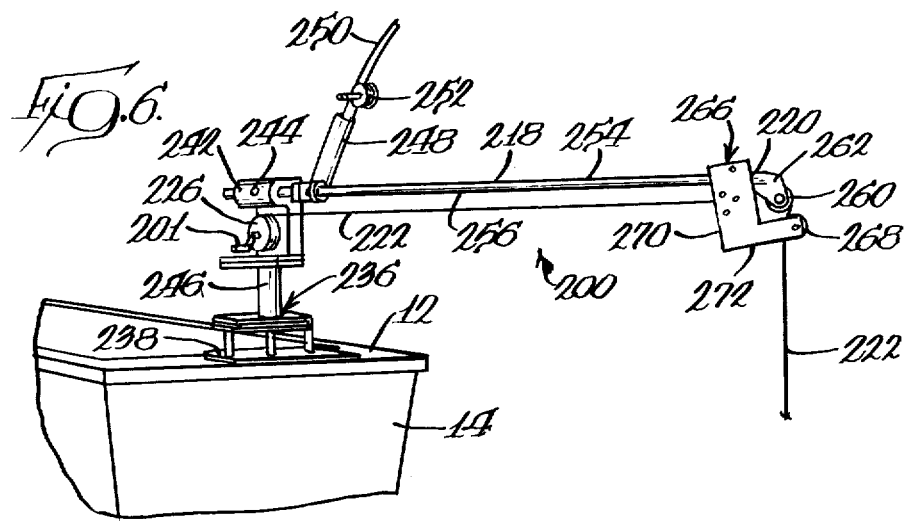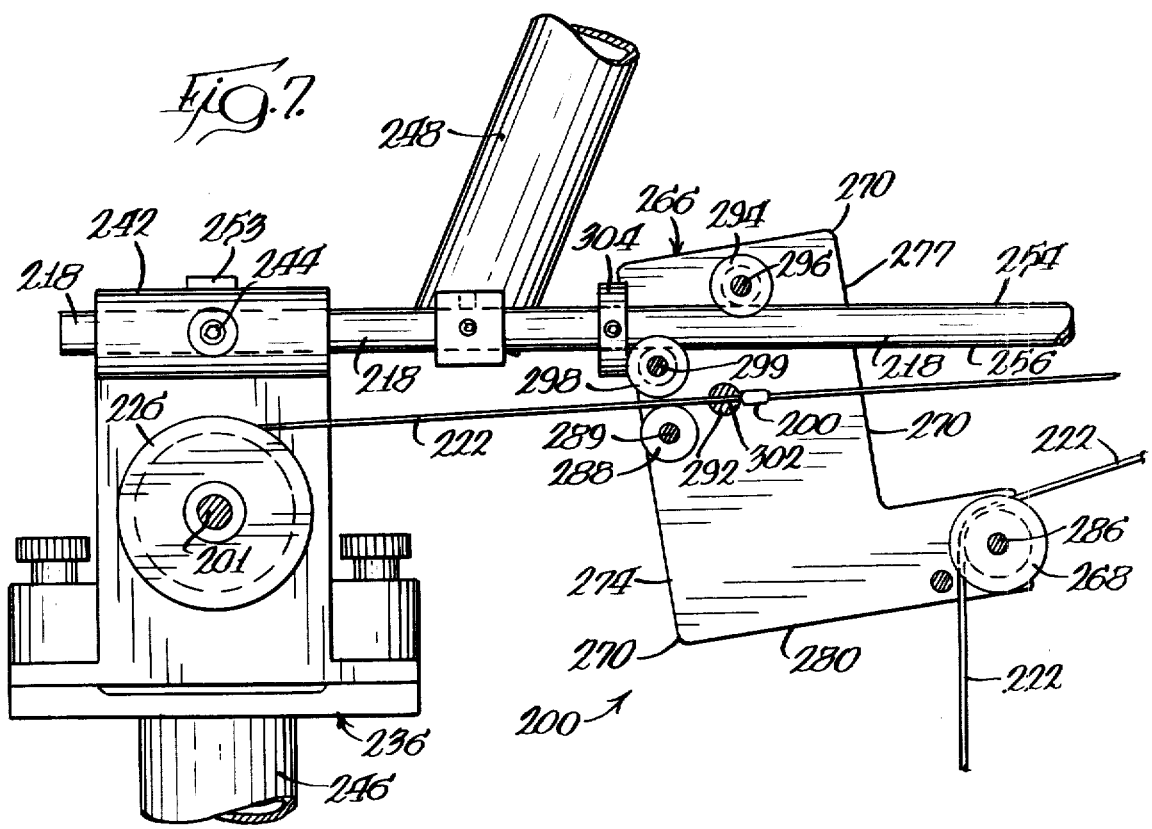

4,248,002

DOWNRIGGER SYSTEM

BACKGROUND OF THE INVENTION

This invention relates to fishing and boating equipment, and more particularly, to a downrigger system for trolling for fish from a boat.

Over the years, a variety of downrigger systems have been developed. These systems have included manually driven downriggers, motor driven downriggers, downriggers with slidable extension arms, downriggers with fixed extension arms and downriggers with temperature sensors. Typifying such downrigger systems are those shown in U.S. Pat. Nos. 3,797,159, 3,925,920, 3,922,808, 3,614,016, 3,785,079, 3,916,555 and 3,628,274. These conventional downrigger systems have met with varying degrees of success.

Some of the conventional downrigger systems have relatively short extension arms and do not position the cable and fishing line safely away from the stern of the boat with the resultant effect that the cable and fishing line become tangled with the boat's propeller.

A long downrigger arm is desirable because it keeps the downrigger cable and fishing line away from the hull and propeller of the boat, as well as from the weighted fishing lines of hand-held rods. However, although long downrigger arms are advantageous, it is often very difficult and cumbersome to reach for and grasp the weighted end of the cable to attach the fishing line, lure and/or bait.

It is therefore desirable to provide a downrigger system which overcomes most, if not all, of the preceding disadvantages.

SUMMARY OF THE INVENTION

An improved downrigger system is provided for permitting a fishing line to be trolled at a desired depth in water at a predetermined safe distance from a boat. Desirably, the downrigger system substantially prevents the downrigger cable and fishing line from becoming tangled with the boat's propeller and with the weighted lines of hand-held rods and permits trolling with more fishing lines.

The downrigger system has either a hand-cranked or motor driven rotatable reel upon which is wound a downrigger cable. The inner end of the cable is connected to the reel. The outer end of the cable is connected to a weight and releasably connected, such as with a quick release device, to a fishing line.

A frame assembly mounts the reel on a boat, such as upon the boat's transom or gunwhale, or upon a teakwood board, such as used by many Great Lakes fishermen.

The downrigger system also includes an elongated downrigger arm that extends from a position aboard the boat, in general proximity to the reel, to a position above the water. The downrigger arm is operatively associated with the reel and is of sufficient length so that its outward end, that is positioned above the water, is safely spaced outwardly and away from the boat's propeller. The outward end of the downrigger arm carries a downrigger arm-guide assembly, such as a rotatable pulley, which has a guide surface that receives and guides the cable as the cable is raised and lowered into the water.

In order to permit the downrigger operator to easily grasp the weighted end of the cable when attaching a fishing line, lure, and/or bait, the novel downrigger system includes a movable carriage assembly and a drive member that is secured to the cable and adapted to drive the carriage assembly. The drive member can be a plug-like stop means and has a maximum width, taken in the direction of the diameter of the cable, that is generally smaller than the maximum width of the guide surface of the pulley at the outer end of the downrigger arm to permit the drive member to ride over the guide surface of the pulley and be lowered into the water as the weighted end of the cable is lowered to the desired water depth.

The movable carriage assembly has a carriage frame. A glide member, such as an arm roller, is operatively connected to the carriage frame to ride upon and along the long downrigger arm. The carriage frame is also operatively connected to a carriage cable guide, such as a lower carriage-frame pulley. The pulley is spaced away from the arm roller, preferably at a location below the downrigger arm and forwardly of the arm roller, in a direction generally towards the outward or distal end and the pulley mounted on the downrigger arm. The pulley receives and guides the flexible cable about the carriage assembly.

The carriage assembly also features a driven member integral with the assembly. The driven member is abuttingly engaged and driven by the drive member when the cable is wound upon the reel. The driven member has a cable-receiving aperture or opening with a diameter that is generally greater than the diameter of the cable to slidably receive and permit passage of the cable therethrough. In order to assure that the driven member is engaged by the drive member for movement along the downrigger arm and so that the drive member does not pass through the cable-receiving aperture of the driven member, the diameter of the cable-receiving aperture should also be smaller than the maximum width of the drive member.

In operation, the carriage assembly is movable from an outward, trolling position with the lower carriage-frame pulley positioned generally below and adjacent the pulley at the outward end of the downrigger arm so as to permit the weighted end of the cable to extend generally vertically into the water, to an inward, attachment position by the action of the drive member on the driven member. In the inward attachment position, the lower carriage-frame pulley is spaced inwardly of the downrigger arm-pulley at the outward end of the downrigger arm, in a direction generally towards the reel, to permit the weighted end of the cable to be grasped and releasably attached to the fishing line.

In one embodiment, the reel and arm roller are positioned generally above the downrigger arm with the arm roller engaging and riding upon the long downrigger arm.

In another embodiment, the reel is positioned generally below the downrigger arm, while the arm roller is positioned generally above the arm to engage and ride upon the long arm.

Preferably, the downrigger arm has an abutment stop for preventing the movable carriage assembly from striking the reel and frame assembly.

In the preferred embodiment, the movable carriage assembly also has an auxiliary cable guide, such as an upper pulley, that is connected to the carriage frame adjacent the driven member to receive and guide the cable.

In the illustrative embodiment, the movable carriage assembly also has an auxiliary glide member, which preferably takes the form of an auxiliary roller rotatably mounted thereon, positioned generally below the downrigger arm to engage and ride against the underside of the downrigger arm. The auxiliary roller cooperates with the arm roller to minimize rocking of the carriage assembly when in use.

A more detailed explanation of the invention is provided in the following description and appended claims, all taken in conjunction with the accompanying drawings.

BRIEF DESCRIPTION OF THE DRAWINGS

FIG. 3 is an enlarged front view of the downrigger system taken substantially along line 3—3 of FIG. 2;

FIG. 4 is an enlarged side view of the carriage assembly in the outward trolling position with portions removed for ease of understanding and clarity;

FIG. 5 is a side view of the portions of the downrigger system taken substantially along 5—5 of FIG. 3, with the carriage assembly moved to its inward attachment position;

FIG. 6 is a perspective view of portions of another downrigger system holding a fishing rod on a boat with the carriage assembly of the downrigger system moved to an outward trolling position in accordance with principles of the present invention; and FIG. 7 is an enlarged fragmentary side view of portions of the downrigger system of FIG. 6 with the carriage assembly moved to its inward attachment position.

DETAILED DESCRIPTION OF THE ILLUSTRATIVE EMBODIMENTS

Figure 1:
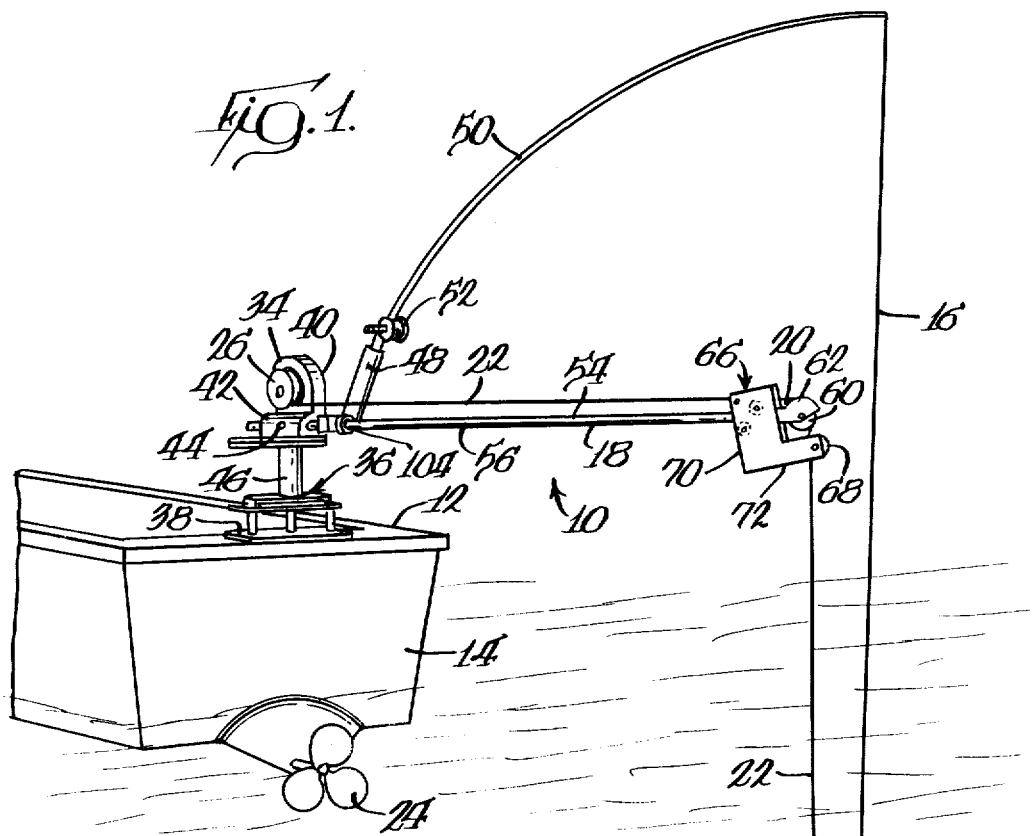
FIG. 1 is a perspective view of a downrigger system holding a fishing rod on a boat with the carriage assembly of the downrigger system moved to an outward trolling position in accordance with principles of the present invention.

Referring to FIG. 1 of the drawings, an elongated downrigger system or assembly 10, sometimes designated "UP-'N-IN," is mounted on the transom 12 of the stern of a boat 14 for trolling or fishing a fishing line 16 at a desired water depth. Downrigger system 10 has an elongated downrigger arm or long extension arm 18 with an outward end 20 that extends over the water from the boat 14 at a distance substantially greater than the reach of a human arm.

Downrigger arm 18 positions fishing line 16 and flexible downrigger cable 22, e.g., braided steel wire, which together form the downrigger lines of downrigger system 10, at a predetermined safe distance from the hull of the boat 14 to substantially prevent the downrigger lines 16 and 22 from becoming tangled with the boat's propeller 24, with the lines of other downriggers and with the weighted lines of hand-held rods.

Downrigger cable 22 has an inner end connected to downrigger reel 26 and an outer end that carries a lead trolling weight or ballast 28, such as a keeled weight of the type sold under the trade name "Herbie the Heavyweight", to the desired water depth. The outer end of downrigger cable 22 provides a weighted end that is releasably connected to fishing line 16 via a release mechanism or line release 30, such as with a Walker adjustable line release, shown in U.S. Pat. No. 3,925,920, assigned to Pacific-Atlantic Products, Ltd. A lure 32 or baited hook is connected to the outer end of fishing line 16 to catch fish at the depth at which the line is being trolled.

In the illustrative embodiment, downrigger reel 26 is positioned generally above the inward portions of downrigger arm 18 and is rotatably driven by a motor 34. It is to be understood that under some circumstances, it may be desirable to use a hand driven reel as shown in FIG. 6.

Downrigger reel 26 is rotatably supported by a downrigger frame assembly 36 that has a base 38 (FIGS. 1 and 2) which provides a mounting plate for mounting reel 26 and downrigger system 10 upon the transom 12 of the boat 14. In some circumstances, it may be desirable to mount reel 26 and downrigger system 10 along the gunwale of boat 14 or upon a teakwood board or the like as is done by Great Lakes fishermen and other fishermen.

Frame assembly 36 has an upper support section or housing 40, that houses motor 34, and has a spindle axle or shaft 41 (FIG. 5) that rotatably supports reel 26. Frame asembly 36 also defines a generally horizontal opening or socket 42 that provides a downrigger arm holder which slidably receives and holds the inward portions of elongated downrigger arm 18. In the preferred form, arm holder 42 has a set screw or thumb screw 44 to releasably lock downrigger arm 18 after arm 18 has been adjusted to the desired effective length. Upper support section 40 of frame assembly 36 and arm holder 42 are elevated above base 38 by post member 46. In some circumstances, it may also be desirable to mount reel 26 and downrigger system 10 on a swivel mounting base.

In the illustrative embodiment, at least one rod holder 48 is fixedly secured to frame assembly 36 to hold a fishing rod 50 equipped with a fishing reel 52 and fishing line 16. Rod holder 48 is positioned at an angle of inclination, such as at an angle of about 70 degrees, relative to mounting plate 38, to position the outer tip of fishing rod 50 above the water. While the above construction is preferred, in some circumstances, it may be desirable to mount the rod holder away from frame assembly 36 or to simply hold the rod by hand.

In the illustrative embodiment, frame assembly 36 carries a digital indicator or readout 53 (FIG. 5) for indicating the length of cable that has been unwound from reel 26.

Referring now to long downrigger arm 18, a rideable top surface 54 and an underside 56 are provided. In the illustrative embodiment, long downrigger arm 18 is of a unitary tubular metal construction, is generally linear or straight and is positioned generally horizontally. In some circumstances, however, it may be desirable to position downrigger arm 18 at an angle of inclination. If desired, downrigger arm 18 can also include one or more threaded or telescoping extension members.

Positioned at the outward end 20 of long arm 18, is a downrigger arm-guide assembly 58 (FIG. 4), which preferably includes a rotatable pulley 60 partly covered by a cover plate and guide plate 62. Pulley 60 has a channel-shaped guide surface 64 (FIG. 4) that rotatably receives downrigger cable 22 and guides the weighted cable-end of cable 22 to the desired water depth.

Figure 2:
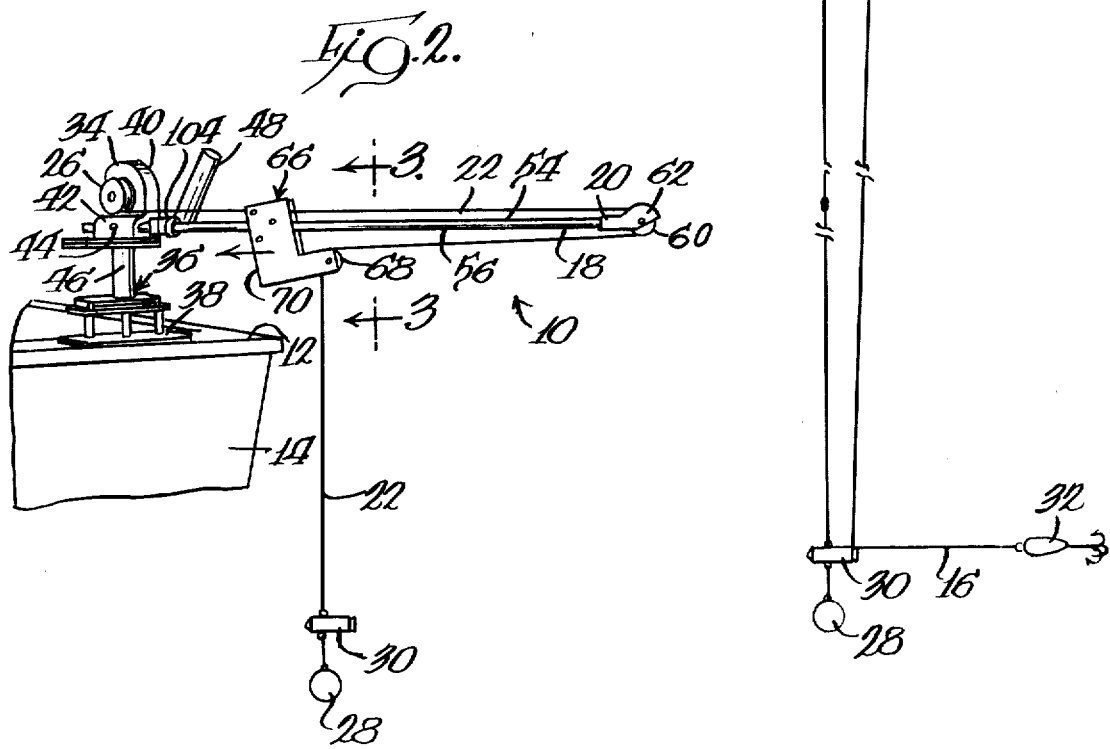
FIG. 2 is a perspective view of the downrigger system with the fishing rod removed and illustrating the carriage assembly as it is moving towards its inward attachment position.

Movable carriage assembly 66 provides means for comfortably grasping the weighted end of cable 22 when it is desired to releasably attach fishing line 16, bait or lure 32 (FIG. 1). In operation, carriage assembly 66 moves from an outward trolling position as shown in FIG. 1, with its lower pulley 68 positioned generally below and adjacent downrigger arm-pulley 60 at the outward end 20 of long arm 18, to permit the weighted end of cable 22 to extend generally vertically into the water, to an inward attachment position as shown in FIG. 5. FIG. 2 illustrates the carriage assembly 66 as it is approaching its inward attachment position. In the inward attachment position, the lower pulley 68 is spaced inwardly of downrigger arm pulley 60 in a direction generally towards downrigger reel 26 to permit the weighted end of cable 22 to be grasped and releasably attached to fishing line 16, bait and/or lure 32.

Carriage assembly 66 has a carriage frame 70 that includes a pair of spaced generally L-shaped protective face plates 72 and 74 (FIG. 3) that are secured together by screws or other fasteners in general parallel relationship to each other. Each of face plates 72 and 74 has an upper roller-receiving portion 76 (FIG. 5) along its upright portion 77, that is positioned generally above downrigger arm 18, and has a lower pulley-receiving portion 78 along its horizontal lower portion or base 80, that is positioned generally below downrigger arm 18. The upright and lower portions 77 and 78 intersect each other to form a lower corner. Lower pulley-receiving portion 78 is positioned forwardly of upper roller-receiving portion 76 in a direction generally towards the outward end 20 and pulley 60 of downrigger arm 18. In the illustrative embodiment, the upright and horizontal distances respectively from axle 86 to axle 96 of each L-shaped face plate 72 and 74 are generally of the same length so that lower arm of the "L" rides in a substantially horizontal position.

Lower pulley 68 provides a carriage guide for the carriage assembly 66, to guide the weighted end of cable 22 into the water in the outward trolling position (FIG. 1) and to position the downrigger lines 16 and 22 relatively close to the frame assembly 36 and reel 26 in the inward attachment position (FIG. 5). Pulley 68 is rotatably connected to the lower pulley-receiving portions 78 of face plates 72 and 74, such as by bolts or axles 86 (FIGS. 4 and 5).

To enhance the stability of carriage assembly 66 and to prevent wear on downrigger line 22, an upper pulley 88, which provides an upper guide member is rotatably connected to the uppermost rearward section of the upright portions 77 of face plate 72 and 74 by bolts or axles 90, to receive and guide cable 22 generally adjacent driven member 92 (discussed below).

Movement of carriage assembly 66 is provided by a glide member 94, which preferably takes the form of an arm roller. Arm roller 94 is rotatably connected to the upper roller-receiving portions 76 of face plates 72 and 74 by bolts or axles 96 (FIGS. 3 and 5). The axis of rotation of arm roller 94 and lower pulley 68, respectively, is located at opposite ends of the hypotenuse of an isosceles right triangle whose right angle is located beneath downrigger arm 18 in general proximity to the lower corner of each L-shaped face plate 72 and 74. In use, arm roller 94 rides upon and along the top surface 54 of downrigger arm 18 to move and support carriage assembly 66 from its outward trolling position (FIG. 1) to its inward attachment position (FIG. 5).

In the preferred embodiment, an auxiliary roller 98 (FIGS. 3-5), which provides an auxiliary guide member, is rotatably connected to carriage frame 70 by bolts or axles 99 at a location slightly below the underside 56 of downrigger arm 18. Auxiliary roller 98 engages and rides against the underside of downrigger arm 18. Advantageously, rollers 94 and 98 cooperate with each other to prevent carriage assembly 66 from being pulled upwardly by cable 22 when carriage assembly is at its inward attachment position and to generally prevent carriage assembly 66 from rocking.

In order to drive carriage assembly 66 from its outward trolling position as shown in FIG. 1 to its inward attachment position as shown in FIG. 5, a plug-like stop member 100 (FIG. 5) which provides a drive member or abutment member is secured to downrigger cable 22 at a predetermined position between the inner end and weighted end of cable 22. The position of this drive member is determined by the length of downrigger arm 18 and is such to permit easy grasp of the weighted end of cable 22 when carriage assembly 66 is in its inward attachment position. Drive member 100 has a maximum width taken in the direction of the diameter of cable 22 that is generally smaller than the maximum width of the guide surface 64 (FIG. 4) of the downrigger arm-pulley 60 located at the outward end 20 of long arm 18 to permit drive member 100 to ride over guide surface 64 and be lowered into the water as the weighted end of cable 22 is lowered to the desired water depth. Drive member 100 abuttingly engages and drives driven member 92 of carriage assembly 66 to move carriage assembly 66 to its inward attachment position when the cable 22 is wound upon downrigger reel 26.

In the illustrative embodiment, the driven member or stop member 92 (FIG. 5) of carriage assembly 66 is in the form of a cylindrically shaped finger which provides an eyelet. Driven member 92 is securely connected to face plates 72 and 74 of carriage frame 70 at a location between intermediate arm roller 94 and upper pulley 88 in general proximity to the upper roller-receiving portions 76. In order to slidably receive and permit passage of cable 22, driven member 92 has a cable-receiving opening or aperture 102 with a diameter generally greater than the diameter of cable 22. The diameter of the cable-receiving opening 102 of driven member 92 is smaller than the maximum width of drive member 100 to prevent passage of drive member 100 through opening 102 and assure that drive member 100 abuttingly engages and drives drive member 100 when cable 22 is wound upon downrigger reel 26.

In the preferred embodiment, an abutment stop 104 (FIG. 5) is secured to downrigger arm 18 at a location between carriage assembly 66 and downrigger reel 26, preferably between carriage assembly 66 and rod holder 48, to substantially prevent the movable carriage assembly 66 from striking the downrigger reel 26 and frame assembly 36.

In order to move carriage assembly 66 to its inward attachment position (FIG. 5), motor 34 is activated to wind cable 22 upon downrigger reel 26 so that drive member 100 drivingly engages the driven member 92 of carriage assembly 66 to move carriage assembly 66 from its outward trolling position (FIG. 1) to its inward attachment position against abutment stop 104. In the inward attachment position, the boat operator or fisherman can easily grasp the weighted end of cable 22 to releasably attach fishing line 16, bait and/or lure 32.

In order to move carriage assembly 66 to its outward trolling position (FIG. 1), motor 34 is driven in the opposite direction to unwind cable 22 from downrigger reel 26. As this occurs driven member 92 will ride against drive member 100 as drive member 100 moves outward towards the outward end 20 of downrigger arm 18 until carriage assembly 66 has moved to its outward trolling position. As the weighted end of downrigger cable 22 is subsequently mechanically lowered into the water to the desired fishing depth, via motor 34, drive member 100 will pass over the guide surface 64 of downrigger arm-pulley 60 and be lowered into the water.

Referring now to the downrigger system 200 shown in FIGS. 6 and 7, system 200 is substantially similar to the downrigger system 10 of FIGS. 1-5, except that downrigger reel 226 is positioned at a height generally below the underside 256 of downrigger arm 218 and the downrigger reel 226 is manually rotated by a hand crank 201. Because cable 222 is located entirely below downrigger arm 218, upper cable-guide pulley 288 and driven member 292 of carriage assembly 266 are connected to the upper middle portion of carriage frame 270 at a location below downrigger arm 218. In this embodiment, arm holder 242 is located above downrigger arm 218.

The other parts and components of downrigger system 200 (FIGS. 6 and 7) are substantially similar to the parts and components of downrigger system 10 (FIGS. 1-5). For ease of understanding and for clarity, similar parts and components of downrigger system 200 have been given part numbers similar to the parts and components of downrigger system 10 (FIGS. 1-5), but increased by an amount of 200, such as downrigger reel 226, downrigger arm 218, etc.

Downrigger system 200 (FIGS. 6 and 7) operates substantially the same as downrigger system 10 (FIGS. 1-5), except that it is handcranked. If desired, downrigger reel 226 can be mechanically driven and wound by a motor such as shown in the downrigger system 10 of FIGS. 1-5.

Although embodiments of the invention have been shown and described, it is to be understood that various modifications and substitutions, as well as rearrangement of parts, can be made by those skilled in the art without departing from the novel spirit and scope of this invention.

What is claimed is:
1. A downrigger system suitable for trolling a fishing line at a desired depth in water at a predetermined distance from a boat, comprising:
   a frame assembly for mounting on a boat;
   a rotatable reel mounted to said frame assembly;
   an elongated downrigger arm operatively associated with said rotatable reel, extending from a position aboard said boat in general proximity to said reel to a position above the water, said downrigger arm having an outward end positioned above the water;
   a flexible cable adapted to be wound upon said reel, said flexible cable having an inner end connected to said reel and an outer end for carrying a weight to a desired depth in the water, said outer end providing a weighted end for being releasably connected to a fishing line;
   downrigger arm guide means positioned adjacent said outward end of said downrigger arm and having a guide surface for receiving said flexible cable and guiding said weighted end of said cable to said desired water depth;
   a drive member secured to said flexible cable between said inner end and said weighted end of said cable, said drive member having a maximum width taken in the direction of the diameter of said cable generally smaller than the maximum width of said guide surface of said downrigger arm guide means for permitting said drive member to ride over said guide surface and be lowered into the water as said weighted end of said cable is lowered to said desired water depth;
   a movable carriage assembly having
      a carriage frame;
      a glide member operatively connected to said carriage frame for riding upon and along said downrigger arm,
      carriage cable guide means operatively connected to said carriage frame and spaced from said glide member for receiving said flexible cable and guiding said weighted end of said cable into said water, and
      a driven member operatively connected to said carriage frame for abuttingly engaging and being driven by said drive member when said flexible cable is being wound upon said reel, said driven member defining a cable-receiving aperture having a diameter generally greater than the diameter of said cable for slidably receiving and permitting passage of said cable therethrough, but being generally smaller than said maximum width of said drive member for substantially preventing passage of said drive member,
   said carriage assembly being movable from an outward trolling position with said cable guide means positioned generally below and adjacent said downrigger arm guide means for permitting said weighted end of said cable to extend generally vertically into said water, to an inward attachment position after said driven member has been engaged by said drive member, with said cable guide means spaced inwardly of said downrigger arm-guide means in a direction generally towards said reel for permitting said weighted end of said cable to be grasped and releasably attached to said fishing line.

2. A downrigger system in accordance with claim 1 wherein:
   said reel is positioned generally above said downrigger arm, and
   said glide member is positioned generally above said downrigger arm for engaging and riding upon said downrigger arm.

3. A downrigger system in accordance with claim 1 wherein:
   said reel is positioned generally below said downrigger arm, and
   said glide member is positioned generally above said downrigger arm for engaging and riding upon said downrigger arm.

4. A downrigger system in accordance with claim 1 wherein said downrigger arm includes an abutment stop to substantially prevent said movable carriage assembly from striking said reel and frame assembly.

5. A downrigger system in accordance with claim 1 wherein said movable carriage assembly further includes auxiliary cable guide means connected to said carriage frame generally adjacent said driven member for receiving and guiding said flexible cable.

6. A downrigger system in accordance with claim 1 wherein:
   said downrigger arm has an underside, and said movable carriage assembly includes an auxiliary glide member positioned generally below said downrigger arm for engaging and riding against the underside of said downrigger arm to substantially prevent said carriage assembly from being pulled upward when said assembly is in the inward position and to generally prevent said carriage assembly from rocking.

7. A downrigger system suitable for trolling a fishing line at a desired depth in water at a predetermined distance from a boat, comprising:

a frame assembly for mounting on a boat, said frame assembly having a downrigger arm-holder and a base providing a mounting plate;

a rotatable reel mounted to said frame assembly;

an elongated downrigger arm having inward portions secured to said downrigger arm-holder and an outward end positioned above the water at a location spaced from the propeller of said boat, said outward end extending over the water from the boat a distance substantially greater than the reach of a human arm;

a flexible cable adapted to be wound upon said reel, said flexible cable having an inner end connected to said reel and an outer end for carrying a weight to a desired depth in the water, said outer end providing a weighted end for being releasably connected to a fishing line;

a rotatable downrigger arm-pulley positioned adjacent said outward end of said downrigger arm and having a guide surface for rotatably receiving said flexible cable and guiding said weighted end of said cable to a location spaced rom said propeller to said desired water depth;

a drive member secured to said flexible cable between said inner end and said weighted end of said cable, said drive member having a maximum width taken in the direction of the diameter of said cable generally smaller than the maximum width of said guide surface of said downrigger arm-pulley for permitting said drive member to ride over said guide surface and be lowered into the water as said weighted end of said cable is lowered to said desired water depth;

a movable carriage assembly having
  a carriage frame;
  an arm roller rotatably connected to said carriage frame for riding upon and along said downrigger arm,
  a carriage frame pulley rotatably connected to said carriage frame and spaced below said downrigger arm at a location generally forwardly of said arm roller in a direction generally towards said downrigger arm-pulley, for receiving said flexible cable and guiding said weighted end of said cable into said water, and
  a driven member connected to said carriage frame at a location in general proximity to said arm roller for abuttingly engaging and being driven by said drive member when said flexible cable is being wound upon said reel, said driven member defining a cable-receiving aperture having a diameter generally greater than the diameter of said cable for slidably receiving and permitting passage of said cable therethrough, but being generally smaller than said maximum width of said drive member for substantially preventing passage of said drive member, said carriage assembly being movable from an outward trolling position with said carriage frame-pulley positioned generally below and adjacent said downrigger arm-pulley for permitting said weighted end of said cable to extend generally vertically into said water, to an inward attachment position after said driven member has been engaged by said drive member on said cable, with said carriage frame pulley spaced inwardly of said downrigger arm-pulley in a direction generally towards said reel for permitting said weighted end of said cable to be grasped and releasably attached to said fishing line.

8. A downrigger system in accordance with claim 7 wherein:
said elongated downrigger arm has a ridable top surface,
said reel is positioned at a height generally above said ridable top surface, and
said arm roller is positioned generally above said ridable top surface for engaging and riding upon said top surface.

9. A downrigger system in accordance with claim 7 wherein:
said elongated downrigger arm has a ridable top surface,
said reel is positioned generally below said elongated downrigger arm, and
said arm roller is positioned generally above said ridable top surface of said downrigger arm for engaging and riding upon said top surface.

10. A downrigger system in accordance with claim 7 wherein said downrigger arm includes an abutment stop positioned at a location between said carriage assembly and said reel to substantially prevent said movable carriage assembly for striking said reel.

11. A downrigger system in accordance with claim 7 wherein said movable carriage assembly includes an auxiliary pulley rotatably connected to said carriage frame generally adjacent said driven member for receiving and guiding said flexible cable.

12. A downrigger system in accordance with claim 7 wherein:
said elongated downrigger arm has an underside, and
said movable carriage assembly includes an auxiliary roller rotatably connected to said carriage frame at a location generally below said underside of said downrigger arm for engaging and riding against said underside.

13. A downrigger system suitable for trolling which comprises:
a frame for mounting on a boat;
a downrigger arm operatively connected to said frame;
a reel rotatably mounted to said frame;
a movable cable carriage on said downrigger arm;
an abutment means on said carriage;
a flexible cable passing through said carriage and adapted for winding upon said reel; and
stop means on said cable for coaction with said abutment means to move said carriage along said downrigger arm in a direction toward said boat.

14. A downrigger system suitable for trolling a fishing line at a desired depth in water at a predetermined safe disatance from a boat to substantially prevent the fishing line from becoming tangled with the propeller of the boat, comprising:

a frame assembly for mounting on a boat, said frame assembly having a downrigger arm-holder and a base providing a mounting plate;

a rotatable reel mounted to said frame assembly;

at least one rod holder secured in fixed relationship to said frame assembly for removably holding a fishing rod equipped with a fishing reel and a fishing line, said rod holder being positioned for holding said rod at an angle of inclination relative to said mounting plate and for positioning an outer tip of said fishing rod above the water;

an elongated downrigger arm having inward portions secured to said downrigger arm-holder and an outward end positioned above the water at a location safely spaced from the propeller of said boat, said outward end extending over the water from the boat a distance substantially greater than the reach of a human arm;

a trolling weight;

a flexible cable adapted to be wound upon said reel, said flexible cable having an inner end connected to said reel and an outer end for carrying said weight to a desired depth in the water, said outer end providing a weighted end for being releasably connected to said fishing line;

a rotatable downrigger arm-pulley positioned adjacent said outward end of said downrigger arm and having a guide surface for rotatably receiving said flexible cable and guiding said weighted end of said cable to a location safely spaced from said propeller to said desired water depth;

a plug-like stop member providing a drive member secured to said flexible cable between said inner end and said weighted end of said cable, said drive member having a maximum width taken in the direction of the diameter of said cable generally smaller than the maximum width of said guide surface of said downrigger arm-pulley for permitting said drive member to ride over said guide surface and be lowered into the water as said weighted end of said cable is lowered to said desired water depth;

a movable carriage assembly having a carriage frame with a pair of protective face plates secured in general parallel relationship to each other, each of said protective face plates having an upper roller-receiving portion positioned generally above said downrigger arm and a lower pulley-receiving portion positioned generally below said downrigger arm, said lower pulley-receiving portion being positioned forwardly of said upper roller-receiving portion a distance generally equal to the vertical distance from the upper roller-receiving portion and in a direction generally towards said downrigger arm-pulley, an arm roller rotatably connected to said upper roller-receiving portion of said face plates for riding upon and along said downrigger arm, a lower pulley rotatably connected to said lower pulley-receiving portions of said face plates and spaced below said downrigger arm for receiving said flexible cable and guiding said weighted end of said cable into said water, a driven member connected to said face plates of said carriage frame at a location in general proximity to said upper roller-receiving portion of said face plates for abuttingly engaging and being driven by said drive member when said flexible cable is being wound upon said reel, said driven member defining a cable-receiving aperture having a diameter generally greater than the diameter of said cable for slidably receiving and permitting passage of said cable therethrough, but being generally smaller than said maximum width of said drive member for substantially preventing passage of said drive member, and an upper pulley rotatably connected to said face plates of said carriage frame at a location slightly rearwardly of said driven member in a direction generally towards said reel for receiving and guiding said flexible cable generally adjacent said driven member, said carriage assembly being movable from an outward trolling position with said lower pulley positioned generally below and adjacent said downrigger arm-pulley for permitting said weighted end of said cable to extend generally vertically into said water, to an inward attachment position after said driven member has been engaged by said drive member on said cable, with said lower pulley spaced inwardly of said downrigger arm-pulley in a direction generally towards said reel for permitting said weighted end of said cable to be grasped and releasably attached to said fishing line.

15. A downrigger system in accordance with claim 14 wherein said elongated downrigger arm has a ridable top surface and an underside, and said downrigger arm spans a distance between said outward end and said reel substantially greater than the length of a human arm.

16. A downrigger system in accordance with claim 15 wherein:

said elongated downrigger arm is positioned generally horizontally, and said reel includes a handcrank for manually rotating said reel and driving said drive member.

17. A downrigger system in accordance with claim 15 wherein:

said elongated downrigger arm is positioned generally horizontally, and said downrigger system includes a motor operatively connected to said reel for mechanically rotating said reel and driving said drive member.

18. A downrigger system in accordance with claim 15 wherein:

said reel is positioned at a height generally above said ridable top surface of said downrigger arm, and said arm roller is positioned generally above said ridable top surface of said downrigger arm for engaging and riding upon said top surface.

19. A downrigger system in accordance with claim 15 wherein:

said reel is positioned at a height generally below said underside of said downrigger arm, and said arm roller is positioned generally above said ridable top surface of said downrigger arm for engaging and riding upon said top surface of said downrigger arm.

20. A downrigger system in accordance with claim 14 wherein said downrigger arm includes an abutment stop positioned at a location between said carriage assembly and said reel to substantially prevent said movable carriage assembly from striking said reel.

21. A downrigger system in accordance with claim 14 wherein said movable carriage assembly includes an auxiliary roller rotatably connected to said carriage frame at a location generally below said underside of said downrigger arm for engaging and riding against said underside of said downrigger arm to substantially prevent said carriage assembly from being pulled upward in the inward position and to generally prevent said carriage assembly from rocking.

22. A downrigger system in accordance with claim 15 wherein the axis of rotation of said arm roller and said lower pulley, respectively, is located at opposite ends of the hypotenuse of an isosceles right triangle whose right angle is located beneath said downrigger arm.

23. A downrigger system in accordance with claim 22 wherein each of said protective face plates of said carriage frame is generally L-shaped and includes a generally upright portion for covering said arm roller, a generally horizontal portion for covering said lower pulley, and a lower corner formed at the intersection of said upright portion and said lower portion in general proximity to said right angle.

* * * * *